(12) United States Patent
Hood et al.

(10) Patent No.: US 7,444,747 B2
(45) Date of Patent: Nov. 4, 2008

(54) ROLLER MOUNT ARRANGEMENT

(75) Inventors: William A. Hood, Reasnor, IA (US);
Calvin D. Meinders, Pella, IA (US);
Scott A. Rempe, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 455 days.

(21) Appl. No.: 10/965,552

(22) Filed: Oct. 14, 2004

(65) Prior Publication Data

US 2006/0080836 A1 Apr. 20, 2006

(51) Int. Cl.
*B21D 53/60* (2006.01)
*B21D 53/10* (2006.01)
*B21D 53/00* (2006.01)
*B61F 15/00* (2006.01)
*F16C 33/66* (2006.01)
*F16C 27/00* (2006.01)

(52) U.S. Cl. .............. 29/891; 29/895; 29/898.06; 29/898.09; 384/185; 384/518; 384/520; 384/535; 384/563

(58) Field of Classification Search ............ 29/891, 29/895, 898.09, 895.22, 898.06; 384/185, 384/495, 517–521, 535, 563, 571, 581; 415/229
See application file for complete search history.

(56) References Cited

U.S. PATENT DOCUMENTS

| 1,556,997 | A | * | 10/1925 | Johnston ............... 384/518 |
| 1,923,777 | A | * | 8/1933 | Delaval-Crow ........... 384/518 |
| 2,101,130 | A | * | 12/1937 | Christman ............. 384/537 |
| 2,956,632 | A | * | 10/1960 | Forbush et al. ........... 180/385 |
| 3,097,895 | A | * | 7/1963 | Matt ................. 384/535 |
| 4,172,621 | A | * | 10/1979 | Yoshida ............... 384/563 |
| 5,030,016 | A | * | 7/1991 | Schoeffter ............. 384/448 |
| 5,062,347 | A | * | 11/1991 | Allais et al. ............ 89/37.07 |
| 5,125,156 | A | * | 6/1992 | Witte ................. 29/898.09 |
| 5,386,630 | A | * | 2/1995 | Fox .................. 29/898.09 |
| 5,549,397 | A | * | 8/1996 | Rode ................. 384/551 |
| 5,564,840 | A | * | 10/1996 | Jurras et al. ............ 384/517 |
| 6,684,506 | B2 | * | 2/2004 | Rode ................. 29/898.09 |

* cited by examiner

*Primary Examiner*—David P. Bryant
*Assistant Examiner*—Alexander P Taousakis
(74) *Attorney, Agent, or Firm*—Sturm & Fix LLP

(57) ABSTRACT

An improved roller assembly for use in machinery such as round balers is disclosed. The roller assembly of the present invention reduces sensitivity to varying dimensional tolerances on the roller assembly and the structure to which the roller assembly is mounted. At least one elastic member is used to permit the axial position of at least one of the bearings on the roller assembly shaft to vary. Spring washers provide a predetermined, axial force to at least one of the bearings.

2 Claims, 8 Drawing Sheets

ROLLER MOUNT ARRANGEMENT

STATEMENT REGARDING FEDERALLY SPONSORED RESEARCH OR DEVELOPMENT

Not Applicable

BACKGROUND OF THE INVENTION

The present invention relates to a mounting arrangement for a roller, with an effective length that varies with a standard manufacturing tolerance, where the roller mounts between a pair of supporting panels spaced apart a distance that varies with a standard manufacturing tolerance. Machines used for forming agricultural crops into cylindrical bales, known as round balers, have historically been constructed including such rollers. The size of the panels and the spacing between the panels are such that normal manufacturing tolerances affect the roller mounting such that the bearings can be subject to axial loading generated by assembly of the components. FIG. 1 illustrates a prior art roller mount arrangement where a roller 100 is supported by two bearings 102, 106 mounted to two panels 10; a drive-side bearing 102 on the drive side where a drive sprocket 104 is mounted to the roller 100 and an idler-side bearing 106 on the side opposite the drive sprocket 104. In this mounting arrangement, although not apparent from this figure, the bearings and mating shafts of the roller are round in cross-section, in which the inner race of each bearing will be secured to the roller in some manner to prevent relative rotation between the bearing and the shaft, in both axial and radial directions.

In addition, axial movement of the drive-side bearing 102 relative to the shaft is limited when a drive end bolt 108 is installed into a threaded hole in the shaft of the roller 100 and tightened, sandwiching the bearing 102 and sprocket 104 between an end-cap 110 and a shoulder 112 of the roller. Axial movement of the idler-side bearing 106 is limited when an idler end bolt 116 is installed into a threaded hole in the shaft of the roller 100 and tightened, sandwiching the idler-side bearing 106 between an end-cap 118 and a shoulder 114. The distance between the two shoulders 112, 114 and the distance between the panels 10 will vary with a manufacturing tolerance. If the roller is too long, the distance between the shoulders 112, 114 too large, and if the bearing flanges 103, 107 were simply bolted to the panels 10, the bearings 102, 106 would be subject to axial loads generated as the bolts supporting the bearing flanges were tightened. To avoid this situation, this prior art design utilizes an assembly wherein the bearing flange 107 is bolted to a bracket 120 which can be moved relative to the panel 10 due to slotted apertures in angles 122, in order to match the dimension required by the distance between shoulders 112, 114. The assembly process is completed in the following order: first, the drive side bearing 102 and sprocket are secured to the roller 100 with the drive end bolt 108 and the end-cap 110, and the bearing flange 103 is secured to the panel 10; second, the idler side bearing 106 is secured to the roller with the idler end bolt 116 and the end-cap 118 and the bearing flange 107 is secured to the bracket 120; lastly, the bracket 120 is secured to the angles 122, that were previously secured to the panel 10, with a bolt 124. This assembly of the bracket 120, angles 122 and bolt 124 allows the bearings 102, 106 to be positioned to match the spacing between shoulders 112, 114. This assembly utilizes several components to achieve this adjustment. An improved assembly would reduce the number of components.

A second prior art design is illustrated in FIG. 2 wherein the bearings 202, 206 support a roller 200, and are mounted to brackets 222 that are secured to the panels 10. Each bearing is secured to the roller 200 with a drive end bolt 208 and an end-cap 210, tightening the inner races of the drive-side bearing 202 against a drive-side shoulder 212 and the idle-side bearing 206 against an idle-side shoulder 214. A drive side spacer 216 is utilized to position the roller such that the sprocket 204 is secured with the bolt 208 and end-cap 210 on the drive side. After the drive side spacer 216, bearing 202, and sprocket 204 are assembled on the roller and secured to the bracket 222, the idler side is assembled by selecting an idler side spacer 218 that is the correct length such that the bearing flange 207 will contact the bracket 222 at approximately the same location as the inner race of the idler side bearing 206 will contact the idler side spacer 218. The idler side bearing flange 207 is secured to the bracket 222 and then the bolt 208 and end cap 210 are installed in the idler side. If the idler side spacer 218 is too short, tightening the bolt 208 will result in axial loading of the bearings equal to the force generated by the bolt 208. If the idler side spacer 218 is too long, it will restrict the travel of the bearing flange 207 to the bracket 222, and an axial load will have been generated when the flange mounting bolts were tightened. Thus, in this arrangement, the proper selection of the spacer 218 is critical. An improved assembly would reduce the critical selection of spacers.

FIG. 3 illustrates a prior art design of a roller mount arrangement that has been used for conveyors, wherein a roller 300 is supported by bearings 302 and a shaft 304. The shaft 304 is constructed from raw material with a hexagonal cross-section, so that the ends will fit into slots in the supporting panels 310 to be held in position while also held from rotating, as a result of the faces of the hexagonal cross-section mating with the slot. In order to simplify installation of the roller assembly, the shaft 304 is allowed to slide axially in a hexagonal inner bore of the bearings 302 and is spring-loaded prior to installing the roller assembly into the panels. The roller assembly includes springs 306, snap rings 308 and washers 312 that cooperate to apply a spring force onto the inner race 303 of the bearing 302. In order to assemble the roller assembly between the supporting panels 310, the shaft 304 on a first side is installed in a receiving aperture in the first side support panel 310 while the shaft 304 is pushed inwards on the opposite side, further compressing the spring 306 on the first side, until the end of the shaft 304 will fit between the supporting panels. As the roller assembly is moved into its proper installed position the shaft 304 will then extend, once properly aligned, with the aperture in the second supporting panel 310. In the final installed position both springs 306 are preloaded to apply a force on the inner race of the bearings to stabilize the shaft and bearings.

BRIEF SUMMARY OF THE INVENTION

According to the present invention there is provided a method and apparatus for reducing the sensitivity to machine tolerance in a roller assembly used in a round baler. To effect this method and apparatus, elastic components are included, allowing variation in the length of the assembly while still providing the appropriate axial load on the fasteners at the ends of the roller shaft.

In one embodiment, the bearing on the end of the shaft on which the sprocket is mounted is rigidly fastened by its flange to a bracket providing an interface between the bearing flange and the panels between which the roller is mounted. The bearing receives an axially-directed force from a spring washer loaded by a bolt to maintain its axial position.

At the opposite end of the roller shaft, the bearing flange is, again, rigidly mated to a bracket. However, the axial position of the bearing is permitted to vary due to the elasticity of a spring or springs on the inner side of the inner bearing race.

In a separate embodiment, a spring washer applies a force to the outer side of the inner bearing race of the bearing opposite the sprocket, thereby providing a flexible restriction to axial movement of the bearing.

In still another embodiment, the spring or springs are replaced by shims, but the spring washers are still used at each end of the roller shaft. At the drive end, the perimeter of the spring washer bears on the sprocket and is forced into the end of the shaft with a bolt. On the opposite end of the shaft, the perimeter of the spring washer bears on the outer side of the inner bearing race while it is forced into the end of the shaft by a bolt.

DETAILED DESCRIPTION OF THE INVENTION

Figure 1:
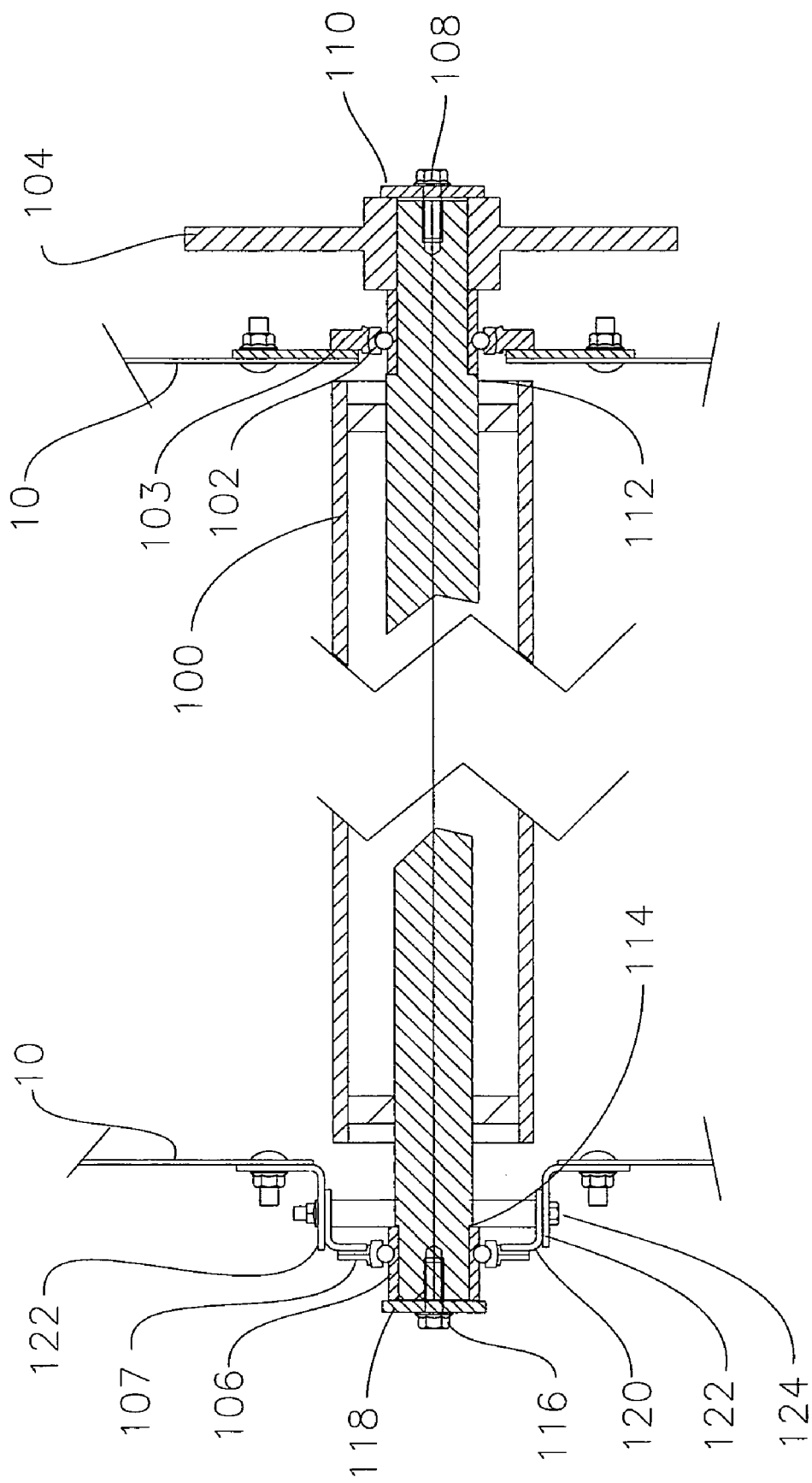
FIG. 1 is a cross sectional view of a first prior art mount arrangement.
Figure 2:
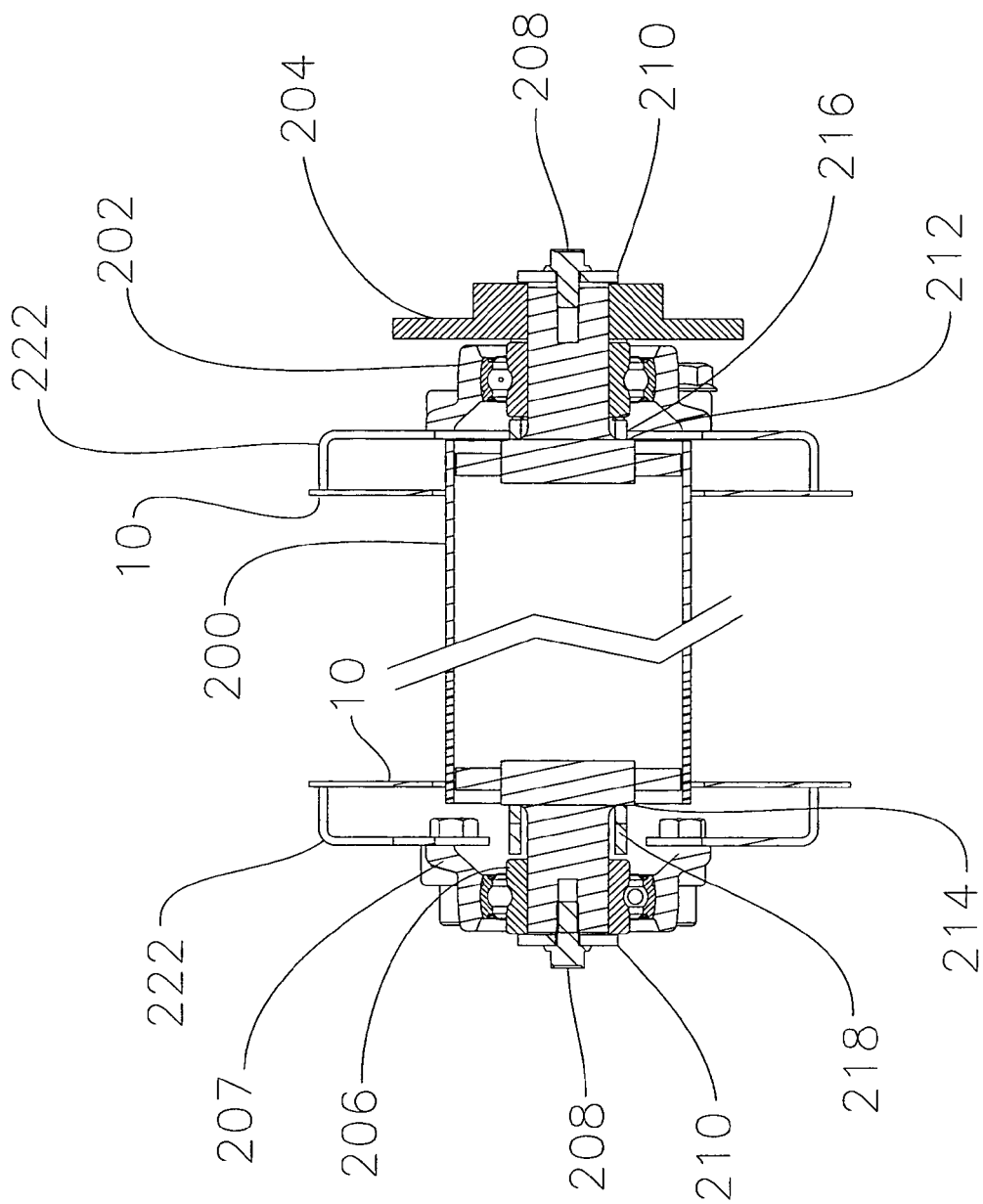
FIG. 2 is a cross sectional view of a second prior art mount arrangement.
Figure 3:
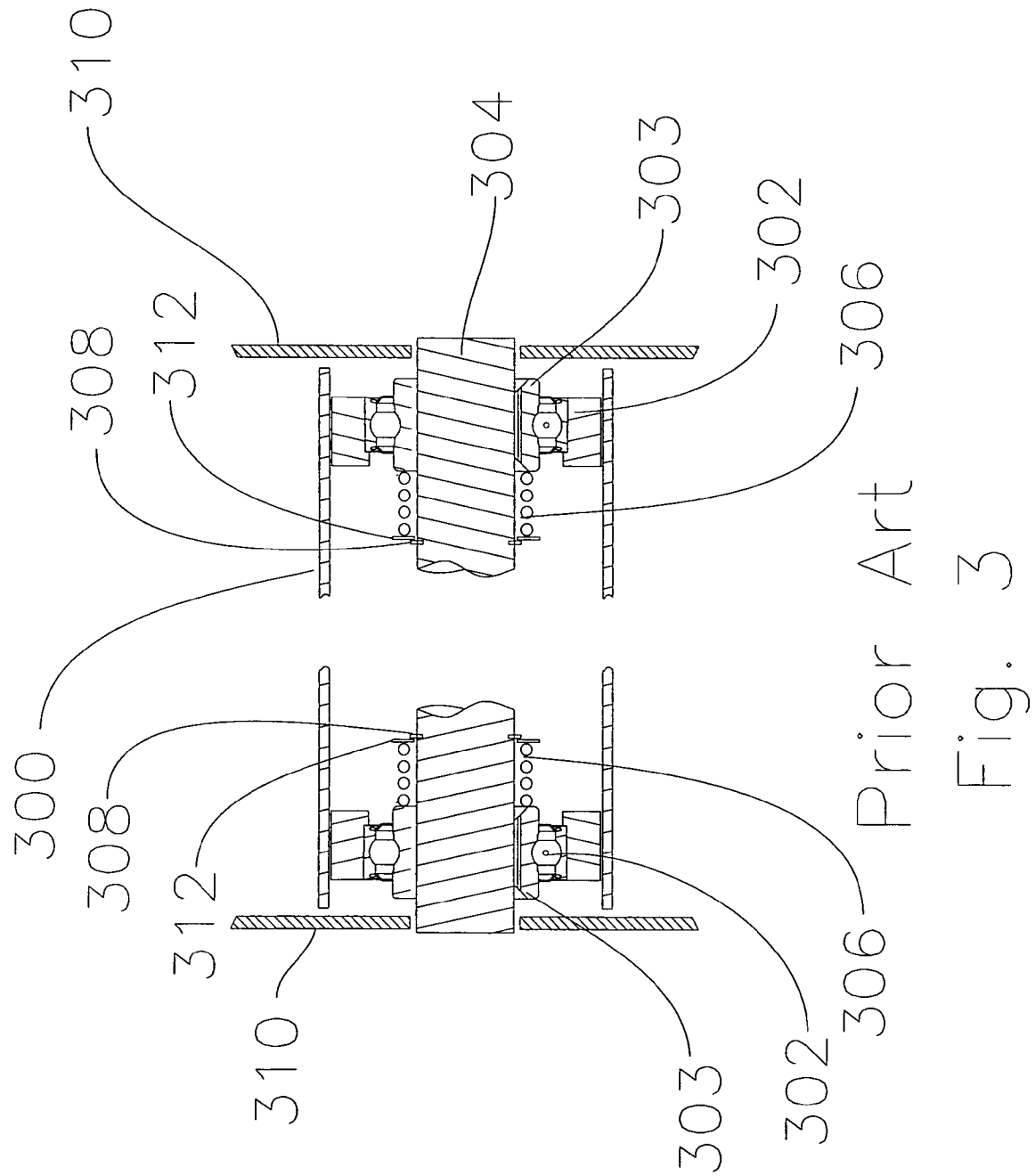
FIG. 3 is a cross sectional view of a third prior art mount arrangement.

Referring now to the drawings wherein like reference numerals designate identical or corresponding parts throughout the several views. The included drawings reflect the current preferred and alternate embodiments. There are many additional embodiments that may utilize the present invention. The drawings are not meant to include all such possible embodiments.

Figure 4:
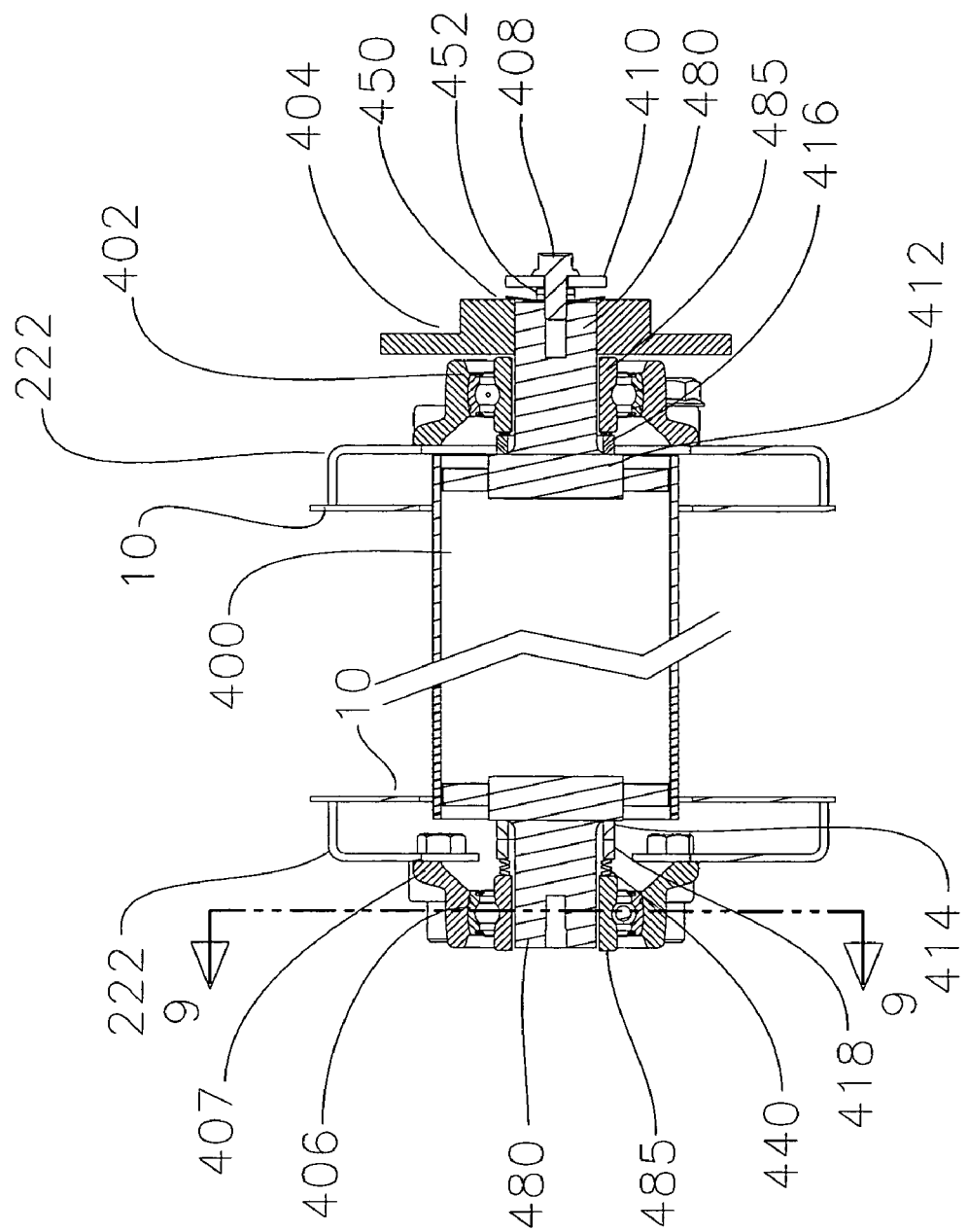
FIG. 4 is a first cross sectional view of a mount arrangement showing a complete roller assembly of the present invention.
Figure 8:
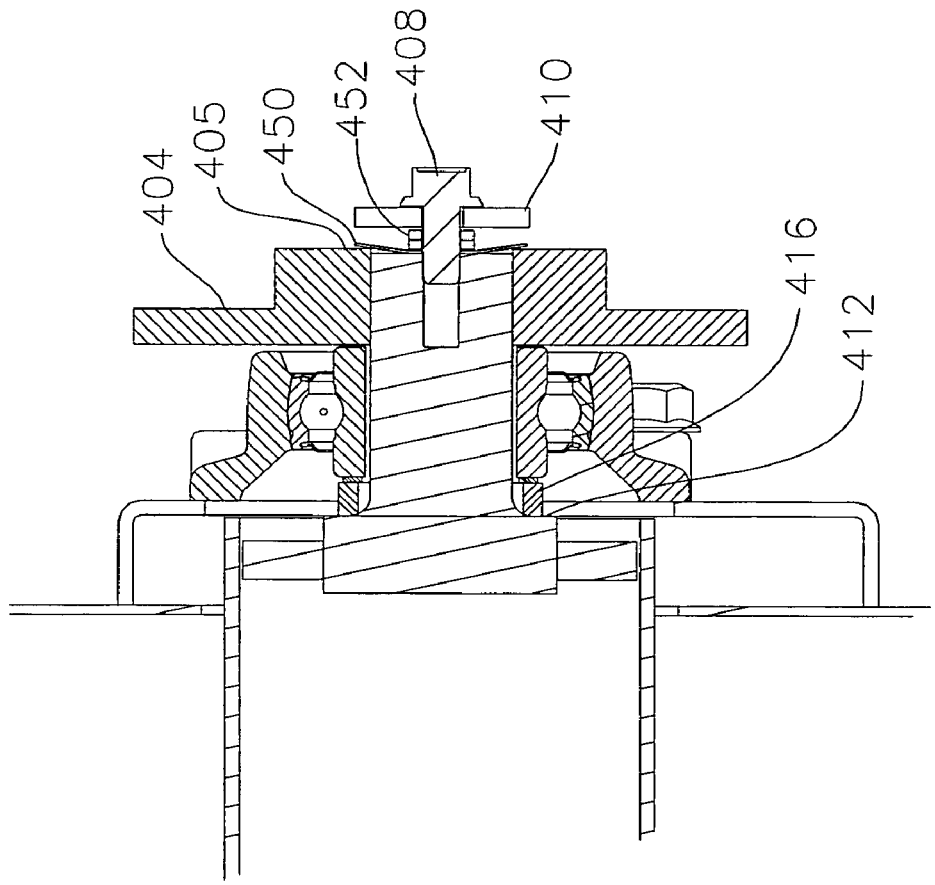
FIG. 8 is a cross sectional view of one side of a mount arrangement including a spring washer of the present invention.
Figure 7:
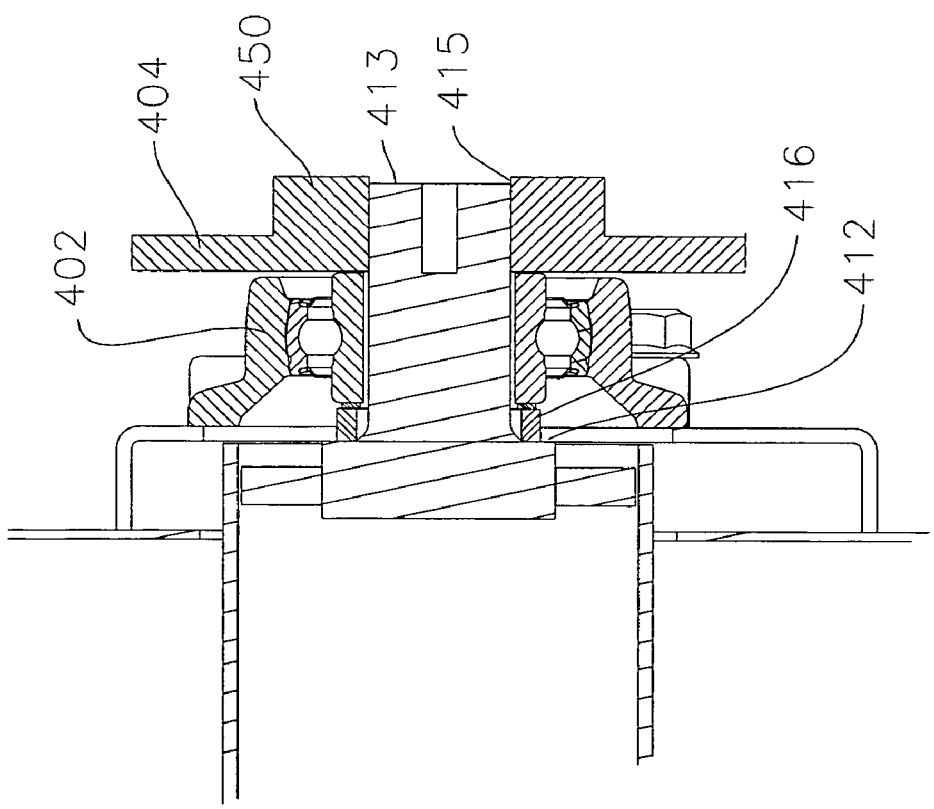
FIG. 7 is a cross sectional view of one side of a mount arrangement prior to installation of the spring washer of the present invention.
Figure 11:
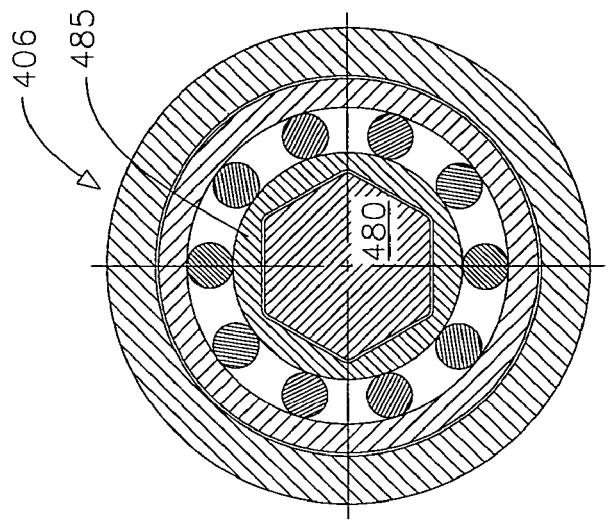
FIG. 11 is a cross-sectional view of the mount arrangement taken along line 11-11 of FIG. 6.
Figure 10:
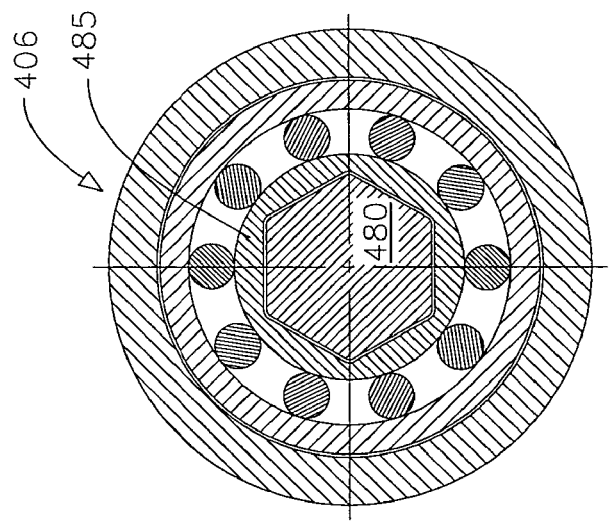
FIG. 10 is a cross-sectional view of the mount arrangement taken along line 10-10 of FIG. 5.
Figure 9:
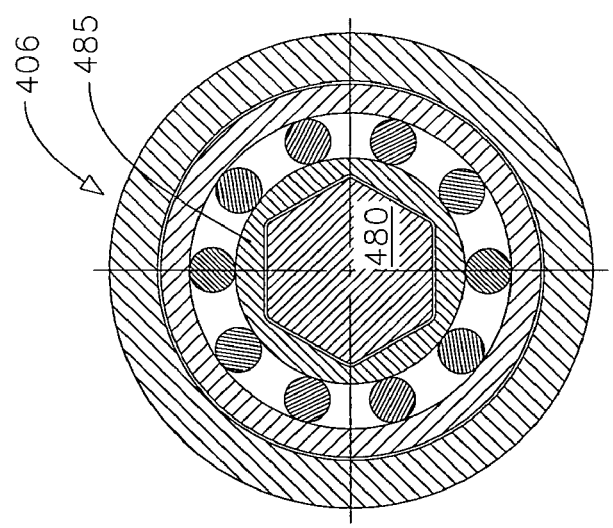
FIG. 9 is a cross-sectional view of the mount arrangement taken along line 9-9 of FIG. 4.

FIG. 4 illustrates a roller 400 supported by two bearings 402, 406, mounted to brackets 222 secured to panels 10 wherein the roller shaft 480 is hexagonal in cross-section, the bearings have mating hexagonal inner bores as shown in FIGS. 9, 10, and 11. The hexagonal cross-section shaft 480 and mating bore secure the bearing onto the roller shaft 480 rotationally, eliminating relative rotation between the shaft 480 and bearings 402, 406. A stop or shoulder 412 is provided against which to bear components on the shaft 480. The stop or shoulder 412 may be formed by machining, or a disc or ring may be fastened to the shaft 480. On the drive side, the right side in FIG. 4, the sum of the axial length of the spacer 416, width of the drive side bearing 402, and thickness of the sprocket 404 is slightly longer than the length of the shaft 480 between shoulder 412 and the end 413 of the shaft 480 so that there is at least a slight clearance 415, as illustrated in FIG. 7. The bearing flange is secured to the bracket 222, locating the roller 400 relative to the panels 10. The components that are mounted onto the shaft 480 are secured axially with a retention system of the present invention comprising a bolt 408, a spring washer 450, washers 452 and an end-cap 410. The components mounted to the shaft 480 between the end-cap 410 and the shoulder 412 of the shaft 480 are clamped together with a force defined by the properties of the spring washer 450 which is deflected from a normally flat shape into the deformed shape as illustrated in FIG. 8 where washers 452 act to force it to the left, as the bolt 408 is tightened, while the outside surface 405 of the sprocket 404 restricts the outer periphery of the spring washer 450 from moving further to the left. The spring force generated is a function of the modulus of elasticity of the material from which the spring washer 450 is constructed, the difference between the outer diameter of the washers 452 and the inner diameter of the bore in the sprocket 404, and the clearance 415 that is illustrated in FIG. 7. These variables can be selected to provide the desired spring force.

After the drive side is so secured to the bracket 222, the idler side is assembled by installing a spacer 418 and springs 440 onto the shaft 480 of the roller 400 as illustrated in FIG. 4. The springs 440 shown in this embodiment are Bellville springs; other types of springs 440 could be used including coil compression springs. A single spring or a plurality of springs may be employed. The overall assembly of the spacer 418 and the spring 440 are of sufficient length that the inside surface of the inner race 485 of the bearing 406 will contact the spring before the flange 407 contacts the plate 222. As the bearing flange 407 is secured to the bracket 222, the bearing 406 will be drawn up such that it is in contact with the bracket 222 after the inner race 485 has contacted the spring 440. This will result in compression of the spring 440, which will generate an axial load on the inner surfaces of the inner races 485 of both bearings 402, 406. This axial loading will be consistent and controlled, while not requiring special attention during the assembly process. The spring force generated from the compressing spring 440 will provide adequate stability of the bearing/roller interface. An advantage of this arrangement is that the spring 440 eliminates the potential of excessive axial loading generated when the idler side bearing 406 is installed. The possibility of generating an axial load is inherent with a design where the spacing between the support panels is fixed with a tolerance, and the length of the roller 400 is fixed with a tolerance. This embodiment will generate a known, predictable loading that can be used to stabilize the inner races 485 of both bearings 402, 406.

Figure 5:
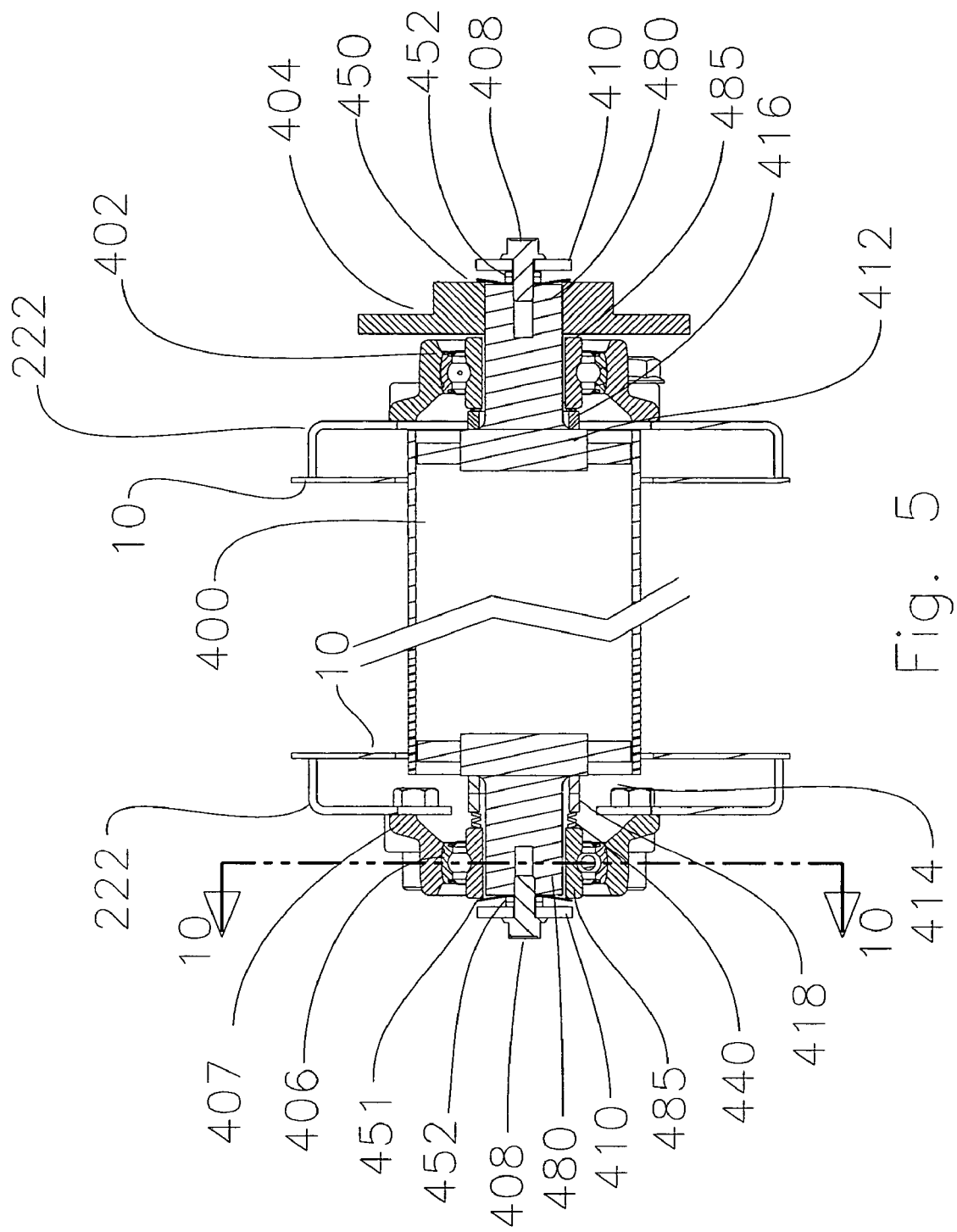
FIG. 5 is a second cross sectional view of a mount arrangement showing a complete roller assembly of the present invention.

FIG. 5 illustrates an embodiment of the present invention wherein a spring washer 451 has been added, acting on the outside surface of the inner race 485 of the bearing 406, in addition to the spring washer 450, as described for FIG. 8, acting on the drive side, stabilizing the bearing/shaft interface.

Figure 6:
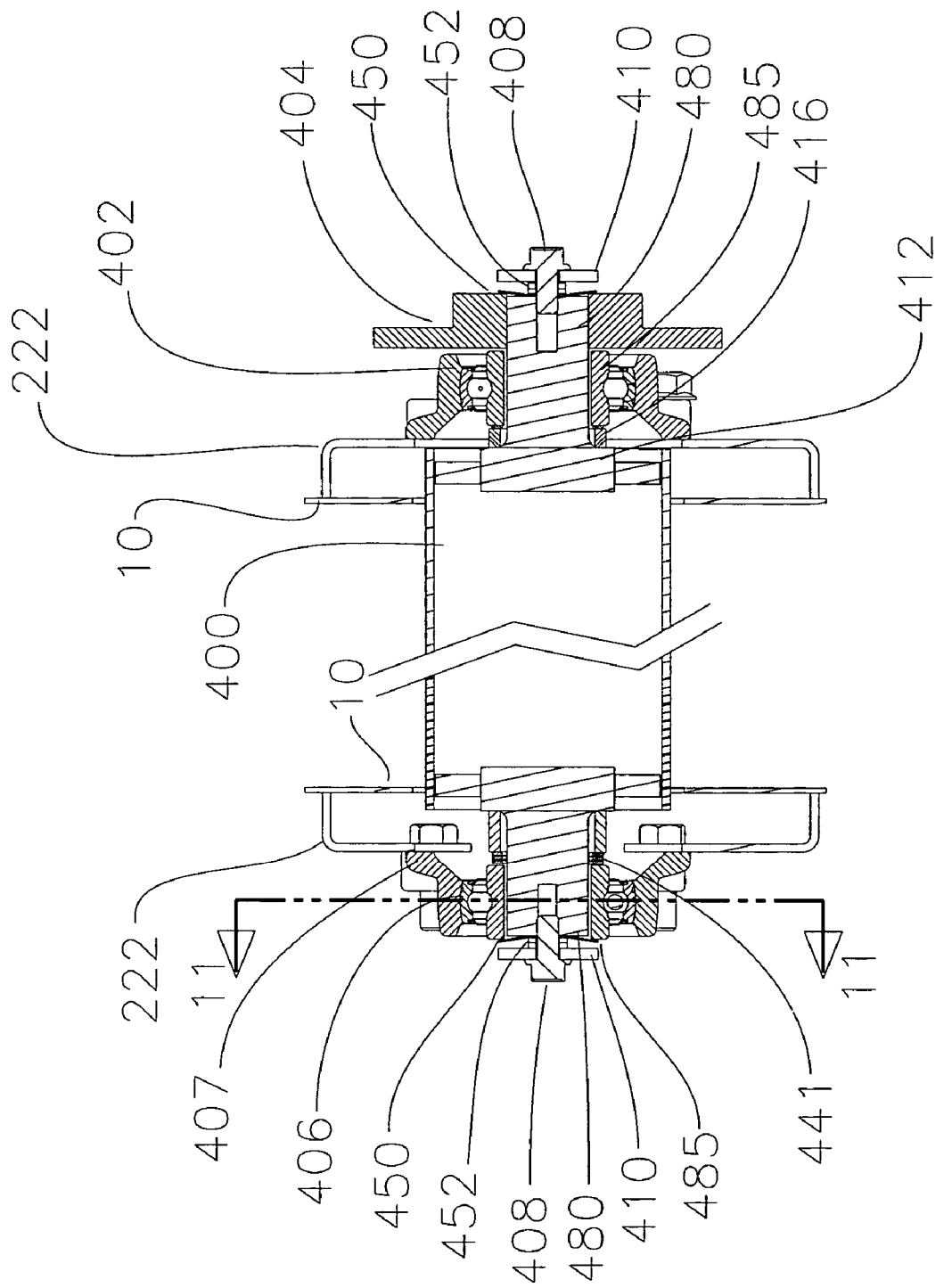
FIG. 6 is a third cross sectional view of a mount arrangement showing a complete roller assembly of the present invention.

FIG. 6 illustrates an embodiment wherein the components of the present invention are alternately combined, where the spring between the spacer 418 and the inner race 485 of the bearing 406 has been removed, and replaced with shims 441. In this embodiment the position of the side panel 10 relative to the idler side bearing 406 is constrained when the assembler, while installing the bearing 406, will take measurements and select the correct number of shims 441 to assure that the bearing 406 can be mounted to the bracket 222 before its inner race 485 contacts the shims 441, while minimizing the clearance. Spring washers 450, 451 are installed, along with washers 452, on both sides to generate a spring force which acts on the inner race 485 of both bearings 404, 406 to stabilize the bearing/shaft interface, while limiting the axial force applied to the bearings 404, 406.

Obviously many modifications and variations of the present invention are possible in light of the above teachings. It is therefore to be understood that, within the scope of the appended claims, the invention may be practiced otherwise than as specifically described.

We claim:

1. An improvement to the mounting system of a roller assembly that varies in length including a roller, spacers and bearings, having radially inner and radially outer races with mounting flanges that is mounted to support panels that cooperate with the mounting flanges of the roller assembly, and that are spaced apart by a varying distance, the improvement comprising the addition of a spring to the roller assembly, inside the bearings, such that the length of the roller assembly, with the spring in an uncompressed condition, is greater than the distance between the support panels so that the spring is compressed and generates an axial load on the radially inner races of the bearings as the bearings are forced into position to mount to the support panels.

2. An improvement to the mounting of components, including a bearing, to a shaft wherein an assembly of the components are located between a shoulder of the shaft and retained to the end of the shaft by a bolt, the improvement comprising:

configuring the length of the shaft between the shoulder and the end of the shaft to be less than the total length of those parts of the mounted components disposed between the shoulder and a first major diameter on a first side of a spring, while retaining that assembly with said spring that is forced into contact with the assembly of the components at the first major diameter on the first side of the spring, while being forced to deflect by contact with at least one washer at a smaller, minor diameter, on a second side of the spring, wherein deflection of the spring generates a defined clamping force.

* * * * *